United States Patent
Pearson et al.

(10) Patent No.: US 7,454,778 B2
(45) Date of Patent: Nov. 18, 2008

(54) ENFORCING RIGHTS MANAGEMENT THROUGH EDGE EMAIL SERVERS

(75) Inventors: Malcolm E. Pearson, Kirkland, WA (US); David R. Reed, Seattle, WA (US); Robert G. Atkinson, Woodinville, WA (US); Steven D. White, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 776 days.

(21) Appl. No.: 10/954,873

(22) Filed: Sep. 30, 2004

(65) Prior Publication Data

US 2006/0089970 A1    Apr. 27, 2006

(51) Int. Cl.
*H04L 9/00* (2006.01)
*H04L 9/32* (2006.01)

(52) U.S. Cl. ..................................... 726/1; 726/2; 726/6

(58) Field of Classification Search .................. 726/1–6, 726/11–15; 713/181; 709/200, 206–207
See application file for complete search history.

(56) References Cited

U.S. PATENT DOCUMENTS 6,308,273 B1  10/2001  Goertzel et al. ............. 713/201
6,721,784 B1*  4/2004  Leonard et al. ............. 709/206
7,162,738 B2*  1/2007  Dickinson et al. ............. 726/14

FOREIGN PATENT DOCUMENTS

GB          2350747        12/2000
WO       WO 99/05814       2/1999

* cited by examiner

*Primary Examiner*—Hosuk Song
(74) *Attorney, Agent, or Firm*—Workman Nydegger (57) ABSTRACT

The present invention provides for methods, systems, and computer program products for ensuring that sensitive subject matter within electronic messages is not inappropriately transferred between domains with differing security rights. The present invention utilizes the appropriate placement of message transfer agents or servers along with policy documents that include configurable semantics pattern recognition data for identifying deviant messages. Once deviant messages or messages that potentially have sensitive subject matter are identified, the present invention further provides for adaptable actions or remedies for ensuring that the sensitive subject matter is not inappropriately transferred between domains.

18 Claims, 5 Drawing Sheets

ENFORCING RIGHTS MANAGEMENT THROUGH EDGE EMAIL SERVERS

CROSS-REFERENCE TO RELATED APPLICATIONS

N/A

BACKGROUND OF THE INVENTION

1. The Field of the Invention

The present invention generally relates to electronic messaging systems. More specifically, the present invention provides for ensuring that confidential, proprietary, privileged or other sensitive subject matter is not inappropriately transferred between domains with differing security rights by utilizing policy documents that include semantics pattern recognition data for identifying deviant messages.

2. Background and Related Art

Electronic message communications among users of various computer systems have been known for many years. Many companies have developed internal electronic messaging systems that allow email communications between various computers connected to corporate Local Area Networks (LANs) and/or other networks. Moreover, companies have reengineered the processes and procedures to take maximum advantage of email communications in order to provide a convenient mechanism for exchanging information and documents; thus reducing the handling of paperwork and speeding the flow of information between and among many employees of various departments. Traditionally, however, large-scaled networks connecting various divisions over vast distance were extremely expensive. In addition, the large-scaled networks which did exist generally used proprietary protocols, which were difficult to interconnect with other networks.

With the growth and development of the Internet, however, this situation dramatically changed. Today, a company may install a corporate LAN at sites separated by large geographical distances and "backbone" communications between sites over the Internet. In many ways, the Internet has become a standard with which any viable network must interact.

The ease in wide spread distribution of messages over the Internet, however, has created growing concerns for many businesses over ensuring that confidential and other sensitive subject matter is only viewed by those with the specific rights to do so. Due to these concerns, encryption techniques have been created that use synchronous or asynchronous keys for securing communications. More recently, the use of the encryption process has been extended to Information Rights Management (IRM), which expresses policies about how content can be used. Information Rights Management provides software that protects ownership of electronic content or messages by restricting what actions an authorized recipient may take in regard to that content. A few of the primary functions of IRM are first to control licensing authorization so that content is unlocked by only authorized intermediate or end-users that have secured a license, and second to control content usage according to the conditions of the license imposed by the author. Another function of IRM is to identify the origin of unauthorized copies of content to further combat piracy.

Originally, the idea of rights management was used to protect against the on-line piracy of commercially marketed materials such as digital periodicals, books, photographs, educational material, video, music, etc. The use of rights management, however, has become increasingly popular in the business setting to protect proprietary or confidential information within a business network. For example, a CEO of a large corporation may wish to distribute an email that includes trade-secrets. Because of the confidential nature of this information, however, the CEO may wish to limit the actions recipients may take in regards to this content. For example, the CEO may wish to allow upper-level management to read, copy, print, and save the confidential information; however, she may wish to limit other employees to no access at all or to read-only access with no forwarding capabilities. Accordingly, through the use of IRM the CEO can specify who's authorized to view the protected content and what actions they may take in regards thereto.

The above paragraph illustrates just one of many examples of the importance of controlling the distribution of messages with sensitive subject matter in a business network environment. Although rights management is becoming a popular tool in business settings, there currently exist several draw backs and deficiencies in this system. For example, typically the recipient of protected content is required to obtain a user license from an IRM server in order to open and use the protect content. Enforcement of the rights within the user license currently relies on the participation of all client applications that interact with the content and relies on application to application trust. In certain instances, however, such reliance or trust is either lacking or can be circumvented.

For example, a recipient may be restricted to read only access with no forwarding capabilities. Without the full participation of all clients that interact with the content, and/or application to application trust, a user may be able to cut and paste the protected content from one application to another. Even if, however, there is a full participation and trust between all client applications, the user may still be able to circumvent the rights management process. For instance, a user may simply print the screen and either retype or scan the information into a form that can be easily transferred in email messages and forwarded inappropriately against the rights management policy expressions. Accordingly, there exists a need to ensure that confidential, proprietary, privileged or other sensitive subject matter is not inappropriately transferred against the rights policies.

BRIEF SUMMARY OF THE INVENTION

The above-identified deficiencies and draw backs of current messaging systems that utilize rights management policies are overcome by the present invention. For example, in an electronic message system, the present invention provides for ensuring that confidential, proprietary, privileged or other sensitive subject matter is not inappropriately transferred between domains with differing security rights by utilizing policy documents that include semantics pattern recognition data for identifying deviant messages.

Example embodiments provide for receiving a message at a message transfer agent located at an edge between at least two domains with different security rights—the message including sensitive subject matter that is not supposed to be inappropriately transferred between the at least two domains based on the security rights of each domain. A policy document is accessed that includes one or more pieces of evidence, which are configurable characteristics corresponding to the sensitive subject matter. These one or more pieces of evidence are then compared with content within the message for identifying the sensitive subject matter in the message. Accordingly, it is then determined what actions are to be taken on the message in accordance with policy remedies for ensuring that the sensitive subject matter is not inappropriately transferred between the at least two domains.

Other exemplary embodiments provide for similar elements as those described above for ensuring the confidential, proprietary, privileged or other sensitive subject matter is inappropriately transferred between domains with differing security rights. Rather than comparing the one or more pieces of evidence with content within the message and determining one or more actions to be taken, this example embodiment provides for scanning the message for identifying the one or more pieces of evidence corresponding to the sensitive subject matter within the message. Based upon the identified one or more pieces of evidence, one or more adaptable actions are triggered for ensuring the sensitive subject matter is not inappropriately transferred between the at least two domains.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program products for ensuring that messages with confidential, proprietary, privileged or other sensitive subject matter are not inappropriately transferred between domains with differing security rights. The embodiments of the present invention may comprise a special purpose or general-purpose computer including various computer hardware, as discussed in greater detail below.

As previously mentioned, typically individuals or businesses do not want confidential, proprietary, privileged or other sensitive subject matter freely distributed over a messaging system to those without proper security authorization. This is not only true for transferring sensitive subject matter outside of an organization, but may also be desirable in controlling the distribution of such content within an organization. For example, a business made up of several departments including research and development, management and legal may wish to control or ensure that legal documents are transferred only between the management and legal department.

As previously mentioned, the present invention provides for methods, systems, and computer program products for ensuring that sensitive subject matter is not inappropriately transferred between domains with differing security rights. The present invention utilizes the appropriate placement of message transfer agents or servers along with policy documents that include configurable semantics pattern recognition data for identifying deviant messages. Once deviant messages or messages that potentially have sensitive subject matter are identified, the present invention further provides for adaptable actions or remedies for ensuring that the sensitive subject matter is not inappropriately transferred between domains.

Figure 1A:
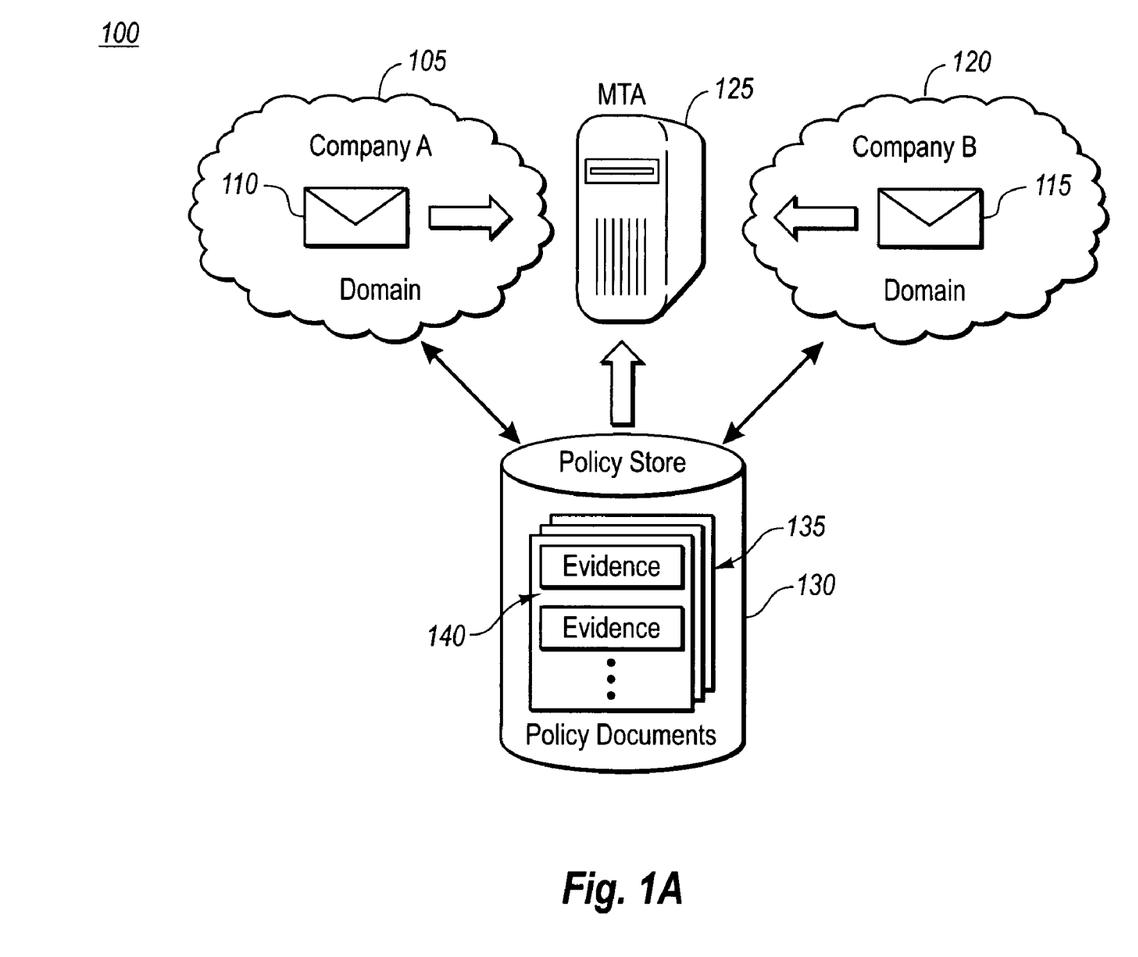
FIG. 1A illustrates a network that utilizes policy documents that include semantics pattern recognition data for identifying deviant messages in accordance with exemplary embodiments.

FIG. 1A illustrates a messaging network 100 that uses an edge server 125 between two domains 105, 120 for ensuring that sensitive subject matter is not inappropriately transferred in accordance with exemplary embodiments. The protocol used to transfer messages may be simple messaging transfer protocol (SMTP) or X400. As shown, server or message transferring agent (MTA) 125 is located between company A's domain 105 and company B's domain 120. MTA 125 monitors all message traffic transferred between each domain 105, 120. Accordingly, as messages (e.g., 110, 115) are received by MTA 125, each message 110, 115 is scanned using policy documents 135 for recognizing sensitive subject matter such as confidential, proprietary, privileged or other rights management properties that are desired to be controlled.

For example, MTA 125 may receive a message 110 from company A's domain 105 and access policy documents 135 within policy store 130. Each policy document 135 includes one or more pieces of evidence 140, which are configurable characteristics corresponding to the sensitive subject matter. Any number of pieces of evidence 140 can be included in a single policy document 135, as indicated by the vertical ellipsis within policy document 135. When sensitive subject mater is created, evidence 140 corresponding to the sensitive subject matter is generated and stored in policy store 130.

Upon receiving message 110, the evidence 140 may be retrieved from policy store 130 and compared with content within the message 110 for identifying potential matches. If one or more matches are determined, then the appropriate actions, as described below, may be implemented on message 110. As previously eluded to above, the portions of message 110 scanned can included the subject line, the body of the message 110, the "To:" field, the "From:" field, or even attachments, etc. Accordingly, the reference to "message" within example embodiments should be interpreted broadly to include any type of content that can be accessed and scanned within a message. Further, sensitive subject matter should also be broadly defined to include confidential, proprietary, privileged or any other rights management properties where control over the subject matter from an ownership or distribution standpoint is desirable.

As one would appreciate, there are a myriad of ways to generate and represent evidence 140. For example, the configurable characteristics of evidence 140 may be an entire document, e.g., a confidential document, which was created.

Other evidence 140 may include key words like "confidential," "attorney/client privilege," etc. Because the evidence is configurable, any type of key word is available to identify subject matter that is not supposed to be passed between the two domains 105, 120.

Other examples of evidence 140 include some form of tagging. For example, tagging may be used to control the documents transferred between various users. In such instance, the destination address and originating address of message 110 may be included as evidence 140 to ensure that communications between these domains does not occur. Of course, other well known ways of tagging sensitive subject matter are also available to the present invention. According, the above tagging using domain addresses is used for illustrative purposes only and is not meant to limit or otherwise narrow the scope of the present invention.

Still other characteristics of sensitive subject matter used as evidence 140 may include as follows: a hash of controlled content—at least a portion thereof; extracts or paraphrasing of the sensitive subject matter, e.g., the content minus punctuation and other trivial signs or words, such as "a," "be," "the," etc.; a summary of the sensitive subject matter; a template of the content; etc. As previously stated, however, because the evidence 140 is configurable, evidence is not limited to any particular form. The evidence 140 only needs to include enough semantics pattern to identify the potential transfer of sensitive subject matter. Accordingly, the above lists of characteristics used as evidence 140 are for illustrative purposes only and are not meant to limit or otherwise narrow the scope of the present invention unless otherwise explicitly claimed.

In other example embodiments, the duration that the evidence 140 exists may be limited. For instance, if information about a company's stock has recently been made known within the organization, e.g., upcoming stock splits, example embodiments allow for evidence 140 that includes key words such as "stock" or "split" to be used up-and-until the time that the information is made public, which assists in preventing or limiting insider trading. Of course, there may be other reasons and types of evidence 140 that can be limited in duration of existence. Accordingly, the above example for preventing insider trading is used for illustrative purposes only and is not meant to limit or otherwise narrow the scope of the present invention.

As one would recognize, policy documents 135 may be generated or created in any number of ways. For example, when the originator of a rights management document creates and sends the document to the recipients, the user can cc or otherwise send the message to a system administer or a client, which can then generate evidence 140. The evidence 140 can be based on input from the system administrator, input from an originator of the sensitive subject matter, a semantics algorithm, a hashing of the sensitive subject matter using a hash function, or any other well known heuristic way of generating some form of pattern recognition data.

Figure 1B:
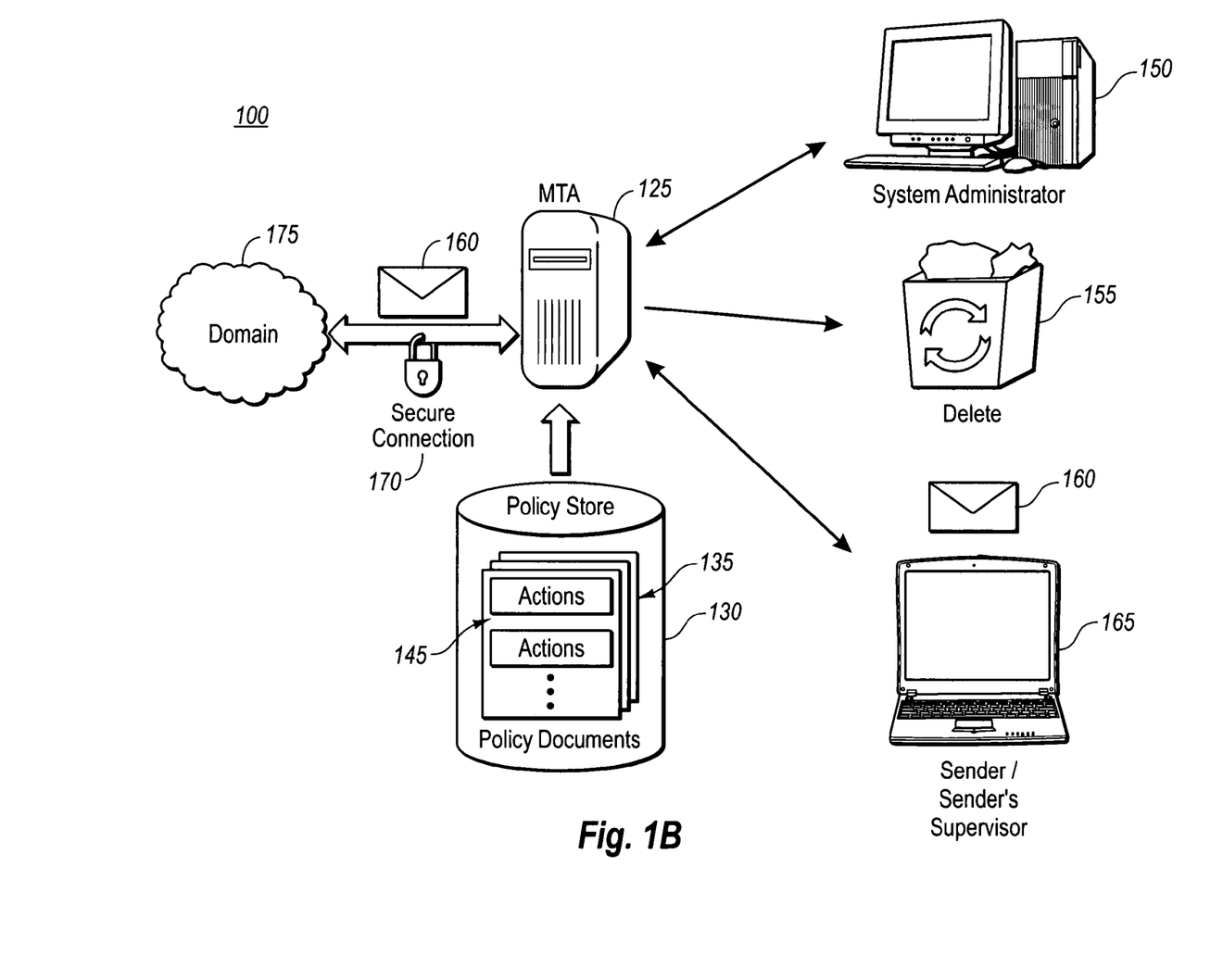
FIG. 1B illustrates the use of policy documents for determining what actions should be taken upon identified deviant messages in accordance with exemplary embodiments.

Regardless of how the evidence 140 and policy documents 135 are created, when MTA 125 discovers a deviant document the present invention further provides for various actions or remedies which can be taken to ensure that the sensitive subject matter is not inappropriately transferred. For example, as shown in FIG. 1B, sender 165 within inside domain 180 may attempt to send a message 160 through MTA 125 to outside domain 175. If MTA 125 discovers that message 160 contains sensitive subject matter that is not suppose to be transferred to outside domain 175, MTA 125 may delete 155 the message, or the sensitive subject matter, send the message to a system administrator 150 for determining the appropriate actions to take on the message, send a notification to the sender's supervisor 165, or send an indication to the sender, e.g., a non-delivery receipt, indicating that the message includes sensitive subject matter, and/or cannot be transferred to outside domain 175.

In such instance where an indication is given to the sender/sender's supervisor 165, system administrator 150, or both, example embodiments provide for prompting these systems for determining whether or not the message can be transferred to outside domain 175. For example, when sender 165 tries to transfer message 160 to outside domain 175—and MTA 125 recognizes sensitive subject matter within message 160—MTA 125 may send a prompt back to sender 165 asking the sender 165 if they know that sensitive subject matter was included within message 160, and whether or not they wish to send the message 160 anyway.

It should be noted that any other number of well known ways of dealing with deviant messages are also available to the present invention. Accordingly, the actions describe herein are not meant to be all inclusive; and therefore, any specific reference to a particular action is used for used for illustrated purposes only and it is not meant to limit or otherwise narrow the scope of the present invention unless explicitly claimed.

Other example embodiments provide that actions 145 may be included within the policy document 135, as well as based on the evidence 140 discovered to correspond to sensitive subject matter within a message 160. For example, if message 160 is discovered to have a word for word representation of the sensitive subject matter, an action 145 of delete 155 the message 160 may corresponding to that particular evidence 140. Alternatively, if message 160 is missing punctuation or any other insignificant semantics such "a", "be", "the"—or any other way of manipulating a document while still maintaining the overall concept—such characteristics may be seen as more egregious; and therefore, an action 145 of sending the message to the system administrator 150 or the sender's supervisor 165 may correspond to this particular evidence 140.

The actions 145 can also be based on a total number of matches of evidence 140 or on any combination of matches. For example, if a key word and template are found as matching evidences 140, then a corresponding action 145 of sending the message 160 to system administrator 150 may be appropriate. Moreover, multiple actions 145 may be appropriate for each piece of evidence 140 discovered. It should be noted that because the actions are configurable and adaptable, any combination of actions 145 corresponding to evidence 140 is available to the present invention. Further, there may be a myriad of reasons or basis for determining what actions to take on deviant messages. Accordingly, the above described specific implementation of actions 145 based on the evidence 140 (either individually, by the number of matches, or combinations of matches) are used for illustrative purposes only and are not meant to limit or otherwise narrow the scope of the present invention unless explicitly claimed.

In other example embodiments, based on evidence 140 discovered to match message 160, it may be determined that message 160 needs to be transmitted over a secure connection. For example, policy document 135 may allow sensitive subject matter to be sent based on, e.g., the sender, recipient, subject matter or any combination thereof, but may require such transfer only occur over a secured connection 170. Accordingly, exemplary embodiments provide that MTA 125 can take the action 145 of creating such secured connection 170 before transferring message 160 to outside domain 175.

Other example embodiment provide for overriding the actions 145 on the basis of the sender's address, the recipient's address, or both. For example, the CEO of a company may have the authority to always send out sensitive subject matter, regardless of the evidence 140 or actions 145 within a policy document 135. In such instances, the MTA 125 can recognize the address of the CEO and override any actions 145 that may otherwise occur. Of course, other override mechanisms are also available, such as allowing the system administrator 150 to allow message 160 to be sent over a secured connection. Accordingly, the above description of override mechanisms and securing connections are used for illustrated purposes only and are not meant to limit or otherwise narrow the scope of the present invention.

It should be noted that server or MTA 125 can control rights management properties for not only a single domain, e.g., company A's domain 105, but also multiple domains for which it sits at the edge of. For example, MTA 125 can also utilize the policy documents 135 within policy store 130 for scanning message 115 for company B's domain 120. Further, MTA 125 can control the flow of traffic for any number of domains, for all outside messages that flow to the Internet, or for any place where it is desirable to control transfer of sensitive subject matter.

Figure 2:
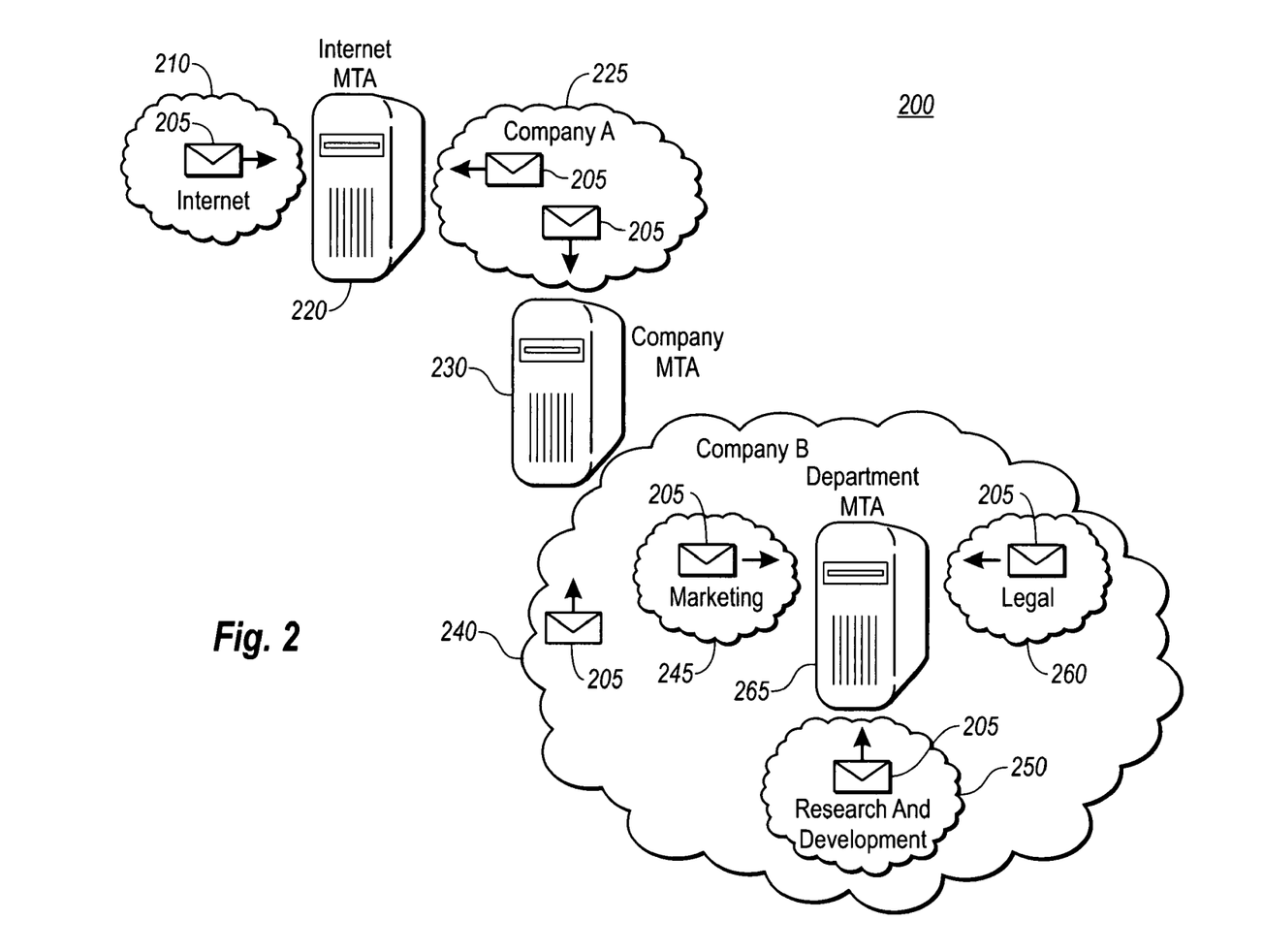
FIG. 2 illustrates various placements of edge servers between domains for implementing exemplary embodiments of the present invention.

For example, as shown in FIG. 2, a network 200 is provided wherein an company A's MTA 220 and company B's MTA 230 sit between Internet 210, and the edge of each company's domain 225, 240. This configuration allows for controlling all message traffic flow 205 in and out of the edges between the companies A 225, B 240 and the Internet 210. Further, within an individual company, a department MTA 265 may be provided that sits between several departments, e.g., marketing department 245, legal department 260, research and development 250, etc. Such configuration allows for controlling message flow 205 through the various departments. Of course, an MTA can be placed at an edge of any type of domain where flow control of sensitive subject matter is desired. Accordingly, the above examples of placing an MTA at the edge of a company or between specific company departments are used for illustrative purposes only and are not meant to limit or otherwise narrow the scope of the present invention unless explicitly claimed.

The present invention may also be described in terms of methods comprising functional steps and/or non-functional acts. The following is a description of steps and acts that may be preformed in practicing the present invention. Usually, functional steps describe the invention in terms of results that are accomplished were as non-functional acts describe more specific actions for achieving a particular result. Although the functional steps and non-functional acts may be described or claimed in a particular order, the present invention is not necessarily limited to any particular ordering or combination of acts and/or steps. Further, the use of act and/or steps in the recitation of the claims and in the following description of the flow chart for FIG. 3 are used to indicate the desired specific use of such terms.

Figure 3:
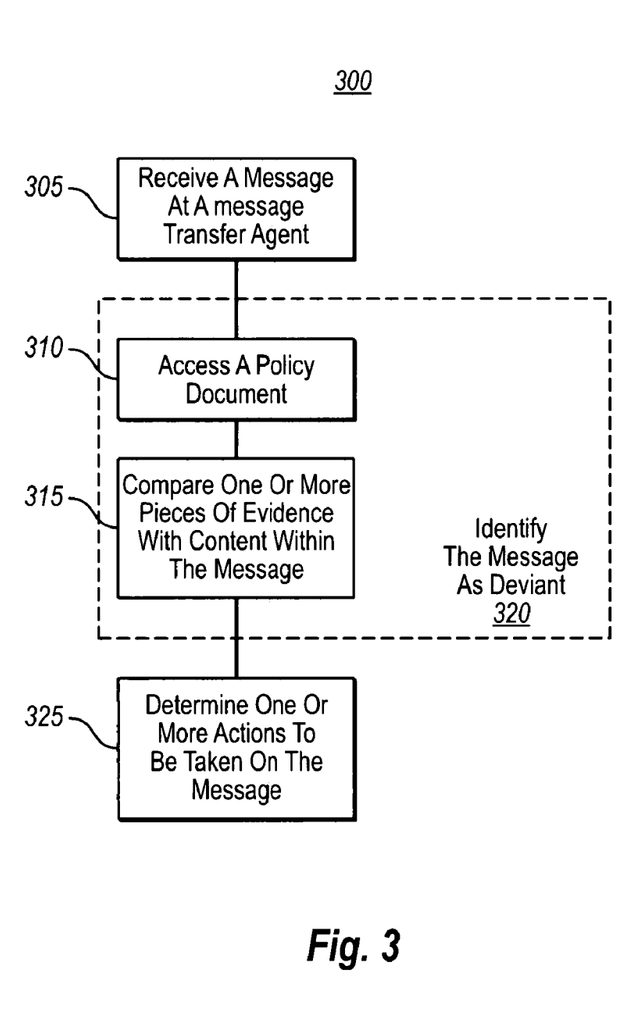
FIG. 3 illustrates an example flow chart of a method of ensuring that sensitive subject matter is not inappropriately transferred between domains with differing security rights in accordance with exemplary embodiments.

FIG. 3 illustrates an example flow chart for various exemplary embodiments of the present invention. The following description of FIG. 3 will occasionally refer to corresponding elements from FIGS. 1A, 1B and 2. Although reference may be made to a specific element from these Figures, such elements are used for illustrative purposes only and are not meant to limit or otherwise narrow the scope of the present invention unless otherwise explicitly claimed.

FIG. 3 illustrates an example flow chart of a method 300 of ensuring that confidential, proprietary, privileged or other sensitive subject matter is not inappropriately transferred between domains with differing security rights. The protocol used for the message system may be SMTP or X400, optionally including any extension to these protocols. Method 300 includes an act of receiving 305 a message at message transfer agent. For example, a message 110 may be received at MTA 125 from company A's domain 105, wherein the MTA 125 is located at an edge between two domains with different security rights 105, 120. Message 110 includes sensitive subject matter that is not suppose to be inappropriately transferred between company A's domain 105 and company B's domain 120, based upon the security rights of each domain.

The sensitive subject matter may be included as an attachment within the electronic message, or may be any other portion of the message. Further, the two domains may be different departments of a single organization, e.g., marketing 245, legal 260 research and development 250 of company B 240. Moreover, the two domains may be different organizations, e.g., company A 225 and company B 240.

Method 300 also includes a step for identifying 320 that the message is deviant. Step 320 includes an act of accessing 310 a policy document. For example, MTA 125 can access one or more policy documents 135 within policy store 130. Each policy document 135 includes one or more pieces of evidence 140, which are configurable characteristics corresponding to the sensitive subject matter. The characteristics of evidence 140 may be one or more of a tagging, pattern of the sensitive subject matter, hash of the sensitive subject matter, word for word match of the sensitive subject matter, extracts, from the sensitive subject matter, keywords associated with the sensitive subject matter, paraphrasing of the sensitive subject matter, summary of the sensitive subject matter or a template corresponding to the sensitive subject matter, etc. Further, the one or more pieces of evidence may be created based on one or more of an input from a system administrator, input from an originator of the sensitive subject matter, a semantics algorithm, a hashing function, etc. Further, the policy document 135 may include evidence 140 about an outside organization's policies, e.g., company B 120, wherein the message 115 is an incoming message from the outside organization.

Step 320 further includes an act of comparing 315 one or more pieces of evidence with content within the message. For example, one or more pieces of evidence 140 within policy document 135 may be compared with content within message 110 at MTA 125 for identifying the sensitive subject matter in the message 110. As such, method 300 also includes an act of determining 325 one or more actions to be taken on the message. The one or more actions taken may be in accordance with policy remedies for ensuring that the sensitive subject matter is not inappropriately transferred between the two domains of company A 105 and company B 120. The actions to be applied may be one or more of a deleting 155 of the message, a deleting 155 of the sensitive subject matter, a sending of a non-delivery receipt back to a client that sent the message 160, forwarding the message to a system administrator 150, forwarding the message to a sender's supervisor 165, etc.

Other exemplary embodiments provide that one of the actions applied may include identifying that the message can be sent using a secured protocol, wherein the method further includes acts of sending a message to sender's address indicating that the message 160 includes a sensitive subject matter; querying the sender 165 whether they still want to transfer the message between the at least two domains, and establishing one or more secure links 170 between at least two domains for transferring the message.

Other exemplary embodiments provide for a method of ensuring that sensitive subject matter is not inappropriately transferred between domains with different security rights by utilizing policy documents that include both semantics pattern recognition data for identifying deviant messages and policy remedies that define how to process the deviant message similar to those above. This embodiment, however, provides for scanning the message for identifying the one or more pieces of evidence corresponding to the sensitive subject matter within the message. Based on the identified evidence, one or more adaptable actions for ensuring that the sensitive subject matter is not inappropriately transferred between the at least two domains if triggered. For example, the actions may be based on the number of matches of evidence within the policy document. Further, the actions may be based on a sender of the message, an intended recipient of the message, or both. Moreover, an override feature may be provided within the policy document based on such information. Other exemplary embodiments provide that the actions may be based on a particular match between content within the message and the one or more pieces of evidence within the policy document.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 4:
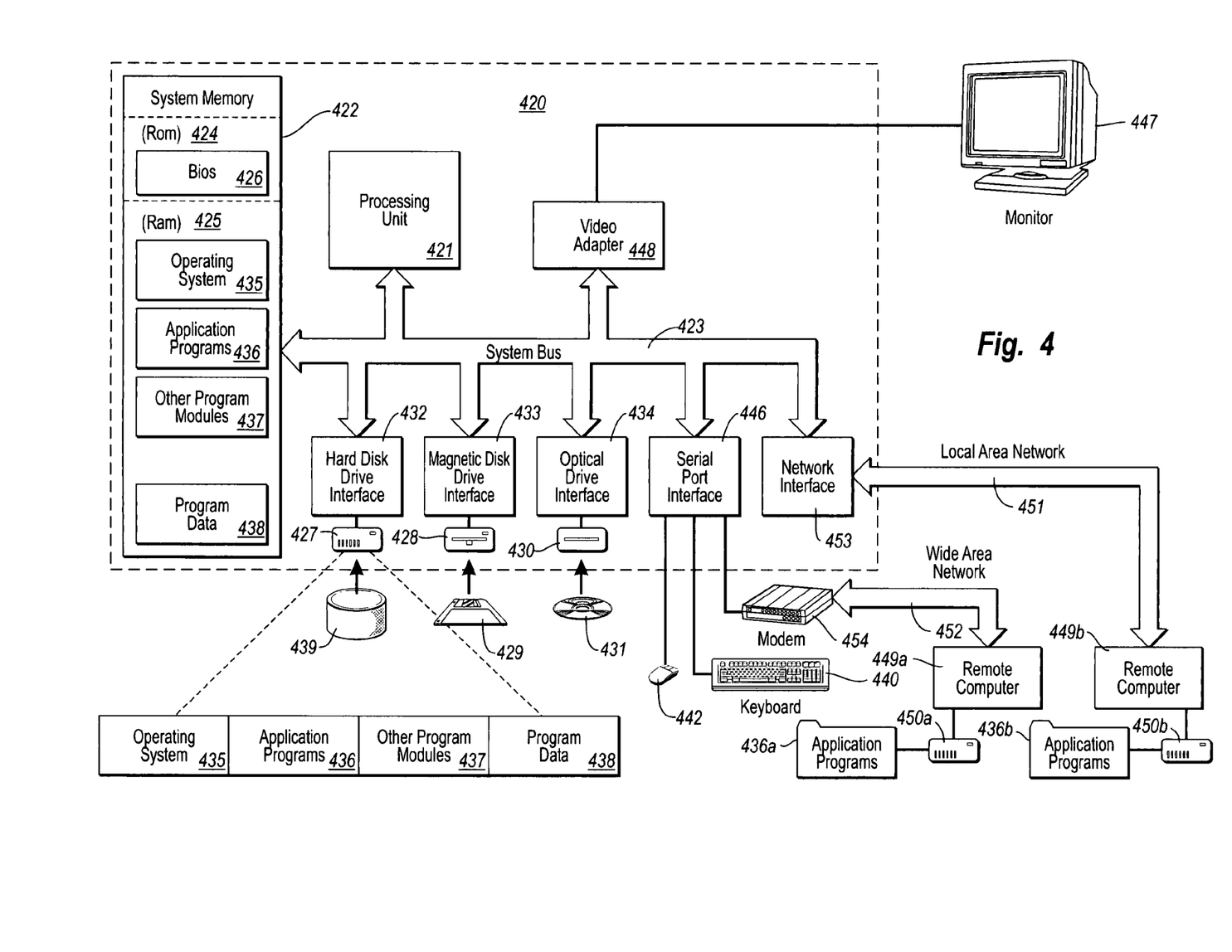
FIG. 4 illustrates an example system that provides a suitable operating environment for the present invention.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by and remote processing devices that are linked (either by hardwired links, wireless links, or by a combination of hardwired or wireless links) through a communications network. In a distributed computing environment, program modules may be located in both and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer. 420, although only memory storage devices 450a and 450b and their associated application programs 436a and 436b have been illustrated in FIG. 4. The logical connections depicted in FIG. 4 include a area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In an electronic messaging system, a method of ensuring that confidential, proprietary, privileged or other sensitive subject matter is not inappropriately transferred between domains with differing security rights by utilizing policy documents that include semantics pattern recognition data for identifying sensitive messages according to policies and semantics, the method comprising acts of:

receiving a message at a message transfer agent located at a boundary between at least two domains with different security rights, the message including sensitive subject matter that is not supposed to be inappropriately transferred between the at least two domains based on the security rights of each domain;

accessing a policy document containing one or more pieces of evidence, which are configurable characteristics comprising semantic recognition data corresponding to the sensitive subject matter contained within the message, and the policy document also containing policy remedies indicating actions to be taken;

comparing each of the one or more pieces of evidence within the policy document with content within the message for identifying the sensitive subject matter in the message;

identifying the sensitive subject matter by determining that there is at least one match between at least one of the pieces of evidence of the policy document and content within the message;

based upon the at least one match between the at least one piece of evidence and the content within the message, determining one or more actions to be taken on the message in accordance with policy remedies for ensuring that the sensitive subject matter is not inappropriately transferred between the at least two domains; and taking the determined one or more actions in accordance with the policy remedies as contained within the policy document.

2. The method of claim 1, wherein the one or more pieces of evidence are created based on one or more of input from a system administrator, input from an originator of the sensitive subject matter, a semantics algorithm or a hashing function.

3. The method of claim 1, wherein the policy document includes evidence about an outside organization's policies, and wherein the message is an incoming message from the outside organization.

4. The method of claim 1, wherein the message being transferred between the at least two domains is being tranferred by a secure protocol.

5. The method of claim 4, wherein the message being transferred between the at least two domains is being transferred by a secure protocol.

6. The method of claim 1, wherein the characteristics are one or more of a tagging, pattern of the sensitive subject matter, hash of the sensitive subject matter, word for word match of the sensitive subject matter, extracts from the sensitive subject matter, keywords associated with the sensitive subject matter, paraphrasing of the sensitive subject matter, summary of the sensitive subject matter or a template corresponding to the sensitive subject matter.

7. The method of claim 1, wherein the sensitive subject matter is included in an attachment within the electronic message.

8. The method of claim 1, wherein the message protocol used to transfer the message is SMTP or X400.

9. A computer program product for use in an electronic messaging system, the computer program product for implementing a method of ensuring that confidential, proprietary, privileged or other sensitive subject matter is not inappropriately transferred between domains with differing security rights by utilizing policy documents that include semantics pattern recognition data for identifying sensitive messages, the computer program product comprising one or more computer readable storage media having stored thereon computer executable instructions that, when executed by a processor, can cause the distributed computing system to perform the method of claim 1.

10. The computer program product of claim 9, wherein the one or more pieces of evidence are created based on one or more of input from a system administrator, input from an originator of the sensitive subject matter, a semantics algorithm or a hashing function.

11. The computer program product of claim 9, wherein the at least two domains are different organizations.

12. The computer program product of claim 9, wherein the characteristics are one or more of a tagging, pattern of the sensitive subject matter, hash of the sensitive subject matter, word for word match of the sensitive subject matter, extracts from the sensitive subject matter, keywords associated with the sensitive subject matter, paraphrasing of the sensitive subject matter, summary of the sensitive subject matter or a template corresponding to the sensitive subject matter.

13. The method of claim 1, wherein the message being transferred between the at least two domains is encrypted.

14. The method of claim 1, wherein the message being transferred between the at least two domains includes a rights management policy with the message.

15. In an electronic messaging system, a method of ensuring that confidential, proprietary, privileged or other sensitive subject matter is not inappropriately transferred between domains with differing security rights by utilizing policy documents that include semantics pattern recognition data for identifying sensitive messages, the method comprising:

an act of receiving a message at a message transfer agent located at a boundary between at least two domains with different security rights, the message including sensitive subject matter that is not supposed to be inappropriately transferred between the at least two domains based on the security rights of each domain;

a step for identifying the message as sensitive by using a policy document that includes one or more pieces of evidence, which are configurable characteristics corresponding to the sensitive subject matter;

an act of determining one or more actions to be taken on the message in accordance with policy remedies for ensuring that the sensitive subject matter is not inappropriately transferred between the at least two domains;

wherein the one or more actions applied are one or more of a deleting the message, deleting the sensitive subject matter, sending a non-delivery receipt back to a client that sent the message, forwarding the message to a system administrator, or forwarding the message to a supervisor of a sender; and wherein the one or more of the one or more actions applied further include identifying that the message can be sent using a secure protocol, wherein the method further includes the acts of:

sending a message to the sender's address indicating that the message includes the sensitive subject matter;

querying the sender whether they still want to transfer the message between the at least two domains; and establishing one or more secure links between the at least two domains for transferring the message.

16. The method of claim 15, wherein the characteristics are one or more of a tagging, pattern of the sensitive subject matter, hash of the sensitive subject matter, word for word match of the sensitive subject matter, extracts from the sensitive subject matter, keywords associated with the sensitive subject matter, paraphrasing of the sensitive subject matter, summary of the sensitive subject mailer or a template corresponding to the sensitive subject matter.

17. In an electronic messaging system, a method of ensuring that confidential, proprietary, privileged or other sensitive subject matter is not inappropriately transferred between domains with differing security rights by utilizing policy documents that include semantics pattern recognition data for identifying sensitive messages and policy remedies that define how to process the sensitive messages, the method comprising acts of:

receiving a message at a message transfer agent located at a boundary between at least two domains with different security rights, the message including sensitive subject matter that is not supposed to be inappropriately transferred between the at least two domains based on the security rights of each domain;

accessing a policy document that includes one or more pieces of evidence, which are configurable characteristics corresponding to the sensitive subject matter;

scanning the message for identifying the one or more pieces of evidence corresponding to the sensitive subject matter within the message; and based on the identified one or more pieces of evidence, triggering one or more adaptable actions for ensuring the sensitive subject matter is not inappropriately transferred between the at least two domains;

wherein the one or more adaptable actions applied are one or more of a deleting the message, deleting the sensitive subject matter, sending a non-delivery receipt back to a client that sent the message, forwarding the message to a system administrator, or forwarding the message to a supervisor of a sender; and wherein the one or more of the one or more adaptable actions applied further include identifying that the message can be sent using a secure protocol, wherein the method further includes the acts of:

sending a message to the sender's address indicating that the message includes the sensitive subject matter;

querying the sender whether they still want to transfer the message between the at least two domains; and establishing one or more secure links between the at least two domains for transferring the message.

18. A computer program product for use in an electronic messaging system, the computer program product used to implement a method of ensuring that confidential, proprietary, privileged or other sensitive subject matter is not inappropriately transferred between domains with differing security rights by utilizing policy documents that include semantics pattern recognition data for identifying sensitive messages and policy remedies that define how to process the sensitive messages, the computer program product comprising one or more computer readable storage media having stored thereon computer executable instructions that, when executed by a processor, can cause the distributed computing system to perform the following:

receive a message at a message transfer agent located at a boundary between at least two domains with different security rights, the message including sensitive subject matter that is not supposed to be inappropriately transferred between the at least two domains based on the security rights of each domain;

access a policy document that includes one or more pieces of evidence, which are configurable characteristics corresponding to the sensitive subject matter;

scan the message for identifying the one or more pieces of evidence corresponding to the sensitive subject matter within the message; and based on the identified one or more pieces of evidence, trigger one or more adaptable actions for ensuring the sensitive subject matter is not inappropriately transferred between the at least two domains;

wherein the one or more adaptable actions applied are one or more of a deleting the message, deleting the sensitive subject matter, sending a non-delivery receipt back to a client that sent the message, forwarding the message to a system administrator, or forwarding the message to a supervisor of a sender; and wherein the one or more of the one or more adaptable actions applied further include identifying that the message can be sent using a secure protocol, the computer program product further comprising computer executable instructions that:

sending a message to the sender's address indicating that the message includes the sensitive subject matter;

querying the sender whether they still want to transfer the message between the at least two domains; and establishing one or more secure links between the at least two domains for transferring the message.

* * * * *